(12) United States Patent
Qian et al.

(10) Patent No.: US 11,059,738 B2
(45) Date of Patent: Jul. 13, 2021

(54) LOW CTE BORO-ALUMINOSILICATE GLASS FOR GLASS CARRIER WAFERS

(71) Applicant: SCHOTT Glass Technologies (Suzhou) Co. Ltd., Suzhou (CN)

(72) Inventors: Pengxiang Qian, Shanghai (CN); Yunfei Hou, Hubei (CN); Junming Xue, Shanghai (CN); Rainer Liebald, Nauheim (DE); Hiroshi Kuroki, Kanagawa (JP)

(73) Assignee: Schott Glass Technologies (Suzhou) Co. Ltd, Jiangsu (CN)

( * ) Notice: Subject to any disclaimer, the term of this patent is extended or adjusted under 35 U.S.C. 154(b) by 50 days.

(21) Appl. No.: 16/052,185

(22) Filed: Aug. 1, 2018

(65) Prior Publication Data

US 2018/0339932 A1 Nov. 29, 2018

Related U.S. Application Data

(63) Continuation of application No. PCT/CN2016/073212, filed on Feb. 2, 2016.

(51) Int. Cl.
 *C03C 3/091* (2006.01)
 *C03C 4/00* (2006.01)
 *C03C 27/00* (2006.01)

(52) U.S. Cl.
 CPC .......... *C03C 3/091* (2013.01); *C03C 4/00* (2013.01); *C03C 4/0085* (2013.01); *C03C 27/00* (2013.01)

(58) Field of Classification Search
 CPC ......... C03C 3/091; C03C 4/00; C03C 4/0085; C03C 27/00; C03B 1/00
 See application file for complete search history.

(56) References Cited

U.S. PATENT DOCUMENTS

| | | | |
|---|---|---|---|
| 5,547,904 | A | 8/1996 | Watzke et al. |
| 5,599,753 | A | 2/1997 | Watzke et al. |
| 5,610,108 | A | 3/1997 | Watzke et al. |
| 2001/0034293 | A1 | 10/2001 | Peuchert et al. |
| 2006/0189470 | A1 | 8/2006 | Mitra |
| 2007/0232478 | A1 | 10/2007 | Fechner et al. |
| 2009/0270242 | A1 | 10/2009 | Yanase et al. |
| 2012/0141668 | A1 | 6/2012 | Nakashima |
| 2013/0202715 | A1 | 8/2013 | Wang et al. |

FOREIGN PATENT DOCUMENTS

| | | | |
|---|---|---|---|
| CN | 104370469 A | | 2/2015 |
| JP | 2005-302289 A | | 10/2005 |
| JP | 2005302289 A | * | 10/2005 |
| JP | 2009-177034 A | | 8/2009 |
| JP | 2009177034 A | * | 8/2009 |
| JP | 2018-504356 A | | 2/2018 |
| WO | 98/27019 A1 | | 6/1998 |
| WO | 2012/126394 A1 | | 9/2012 |
| WO | 2013020128 A1 | | 2/2013 |
| WO | 2015/091134 A1 | | 6/2015 |

OTHER PUBLICATIONS

International Search Report dated Nov. 9, 2016 for International Application No. PCT/CN2016/073212 (2 pages).
Japanese Office Action dated Oct. 29, 2019 for Japanese Application No. 2018-540104 (8 pages).
English translation of the Japanese Office Action dated Oct. 29, 2019 for Japanese Application No. 2018-540104 (10 pages).
Chinese Office Action dated Jun. 1, 2020 for Chinese Application No. 201680080139.9 (11 pages).
English translation of Chinese Office Action dated Jun. 1, 2020 for Chinese Application No. 201680080139.9 (11 pages).
Japanese Office Action dated May 10, 2021 for Japanese Application No. 2020-089132 (3 pages).
English translation of Japanese Office Action dated May 10, 2021 for Japanese Application No. 2020-089132 (2 pages).

\* cited by examiner

*Primary Examiner* — Elizabeth A. Bolden
(74) *Attorney, Agent, or Firm* — Taylor IP, P.C.

(57) ABSTRACT

A low CTE boro-aluminosilicate glass having a low brittleness for use in wafer-level-packaging (WLP) applications is disclosed. The glass comprises a composition in mol-% of $SiO_2$: 60-85, $Al_2O_3$: 1-17, $B_2O_3$: 8-20, $Na_2O$: 0-5, $K_2O$: 0-5, MgO: 0-10, CaO: 0-10, SrO: 0-10, and BaO: 0-10. An average number of non-bridging oxygen per polyhedron (NBO) is equal to or larger than −0.2 and a ratio $B_2O_3/Al_2O_3$ is equal to or larger than 0.5. The NBO is defined as $NBO=2\times O_{mol}/(Si_{mol}+Al_{mol}+B_{mol})-4$. A glass carrier wafer made from the low CTE boro-aluminosilicate glass and a use thereof as a glass carrier wafer for the processing of a silicon substrate are also disclosed, as well as a method for providing a low CTE boro-aluminosilicate glass.

17 Claims, 4 Drawing Sheets

LOW CTE BORO-ALUMINOSILICATE GLASS FOR GLASS CARRIER WAFERS

CROSS REFERENCE TO RELATED APPLICATIONS

This is a continuation of PCT Application No. PCT/CN2016/073212, entitled "LOW CTE BORO-ALUMINO-SILICATE GLASS FOR GLASS CARRIER WAFERS", filed Feb. 2, 2016, which is incorporated herein by reference.

BACKGROUND OF THE INVENTION

1. Field of the Invention

The present disclosure concerns a low CTE boro-aluminosilicate glass with low brittleness for use as in glass carrier wafers. The disclosure also concerns a glass carrier wafer made from the low CTE boro-aluminosilicate glass and a use thereof as a glass carrier wafer for the processing of a silicon substrate. The disclosure further concerns a method for providing a low CTE boro-aluminosilicate glass.

2. Description of the Related Art

Solid state electronic devices as, e.g., semiconductor chips or dies, are typically manufactured from a semiconductor material such as silicon, germanium or gallium/arsenide. Circuitry is formed on one surface of the device with input and output pads formed, e.g., around the periphery.

A profusion of small electronic consumer products includes, e.g., notebooks, smart phones, digital cameras, modems, global positioning systems and electronic watches. The rapidly growing consumer demand for small product sizes and low profile products drives the search for ways to construct smaller, thinner, and more powerful semiconductor devices, which can be efficiently produced at a high yield. The development of inexpensive, ultra-thin, compact devices is therefore needed to enable the proliferation of large numbers of miniature electronic devices in the future.

For example, wafer-level-packaging (WLP) has been widely applied as a technology of tightly packaging, e.g., an integrated circuit, while still being part of the wafer, in contrast to the more conventional method of slicing the wafer into individual circuits (dice) and then packaging them. The resulting package is practically the same size as the die. WLP allows integration of wafer fabrication, packaging, test, and burn-in at a wafer level in order to streamline the manufacturing process undergone by a silicon device from start to customer shipment. It is readily acknowledged that WLP can be a dominant component regarding the final manufacturing cost and resulting dimensions of a device.

Reusable glass carrier wafers are widely applied in the semiconductor industry as carrier wafers for, e.g., thinning or back-grinding of silicon substrates. Such glasses should have a coefficient of thermal expansion (CTE) that is sufficiently close to the CTE of the semiconductor substrate material as, e.g., silicon material, in order to avoid cracks or warping due to unbalanced thermal expansion between glass carrier wafer and silicon substrate, e.g., during processing. The glasses described in, e.g., U.S. Pat. No. 5,599,753 A (Jenaer Glaswerk GmbH) and U.S. Pat. No. 5,610,108 A (Schott Glaswerke), have a coefficient of thermal expansion (CTE) of 4-6 ppm/K and are therefore not suitable as glass carrier wafers for silicon substrates due to the CTE mismatch. Other borosilicate glasses as proposed in, e.g., U.S. Pat. No. 5,547,904 A (Schott A G), contain $Li_2O$ which is not preferred in semiconductor industries since the silicon substrate can be contaminated by lithium ions.

In contrast to such glass carrier wafer applications, glasses for WLP applications or other applications where the glass needs to be cut also need to have a good dicing performance. Alkali-free aluminosilicate glasses with low CTE similar to silicon and which are otherwise suitable as glass carrier wafers often have a poor cutting or dicing performance. It is therefore a need in the art to provide a glass that is not only suitable for semiconductor carrier wafer applications but also has a high dicing or cutting performance ensuring, e.g., a high dicing yield.

SUMMARY OF THE INVENTION

The present disclosure provides a glass which overcomes some of the disadvantages of the prior art. In particular, some exemplary embodiments of the present disclosure provide a glass with a low CTE, in particular a CTE close to the CTE of silicon, and a glass wafer made thereof with a good dicing or cutting performance. Some exemplary embodiments of the present disclosure provide a glass and a glass carrier wafer made thereof that is suitable for the use in the semiconductor industry, in particular for WLP or MEMS applications. Some exemplary embodiments of the present disclosure provide a glass or glass wafer made thereof for the use in the semiconductor industry that allows for a cost efficient production of semiconductor devices. Some exemplary embodiments of the present disclosure provide a glass and glass wafer having a high dicing yield, in particular for the use in WLP or MEMS applications.

"Low CTE glass" hereby generally refers to a glass with a CTE equal to or smaller than 4.0 ppm/K.

Exemplary embodiments of the present disclosure are based on the insight that a key factor for the dicing quality or performance of a glass wafer (when evaluated by the edge chipping properties) is a low hardness but high fracture toughness of the glass composition. Exemplary embodiments of the present disclosure are based on the surprising insight that the desired properties can be obtained by adjusting the ratio of "network modifiers" and "network formers" and the ratio of "boron oxide" over "aluminium oxide" of a given boro-aluminosilicate glass composition at the same time.

The present disclosure, therefore, concerns a low CTE boro-aluminosilicate glass that has a low brittleness for, e.g., use in wafer-level-packaging (WLP) applications, comprising a composition in mol-% of:

| | |
|---|---|
| $SiO_2$ | 60-85, |
| $Al_2O_3$ | 1-17, |
| $B_2O_3$ | 8-20, |
| $Na_2O$ | 0-5, |
| $K_2O$ | 0-5, |
| MgO | 0-10, |
| CaO | 0-10, |
| SrO | 0-10, and |
| BaO | 0-10, wherein | the average number of non-bridging oxygen per polyhedron (NBO) is equal to or larger than −0.2 and a ratio $B_2O_3/Al_2O_3$ is equal to or larger than 0.5, wherein the NBO is defined as $NBO=2\times O_{mol}(Si_{mol}+Al_{mol}+B_{mol})-4$.

The increase of the average number of NBO and/or the ratio of $B_2O_3/Al_2O_3$ above certain values is expected to yield only limited further improvement in terms of brittleness and thus yield no significant increase in the resulting dicing performance anymore. Moreover, too high an NBO number and/or a $B_2O_3/Al_2O_3$ ratio may render the glass unsuitable for bonding with silicon in, e.g., WLP applications, due to an increasing mismatch in the CTE. It has been found that, for most required applications, an average number of NBO may be equal to or less than −0.1 and a ratio of $B_2O_3/Al_2O_3$ may be equal to or less than 10 to yield a glass composition with useful properties regarding dicing performance and, at the same time, a CTE that sufficiently matches silicon in order to allow for bonding with silicon during processing. It is to be understood, however, that, dependent on the specific application, NBO and $B_2O_3/Al_2O_3$ values beyond these upper limits can also provide for useful glass compositions if, e.g., a CTE match with silicon is not required.

Considering the structure of glass, the concept of NBO (Non-Bridging Oxygen) is widely used. NBO can be regarded as a parameter reflecting the network structure of a glass resulting from the specific chemical composition. It has surprisingly been found that the network structure indicated by the NBO of the low CTE glasses as described herein can advantageously influence the brittleness index expressed as $H_V/K_{IC}$ and thereby the dicing performance of the glass.

The glass network structure can be characterized with four parameters X, Y, Z and R, defined as follows:
X=average number of non-bridging oxygen per polyhedron, i.e., NBO;
Y=average number of bridging oxygen per polyhedron;
Z=total average number of oxygen per polyhedron; and
R=ratio of total number of oxygen to total number of network formers.

R can be deduced from the molar composition of the low CTE glass. The four parameters X, Y, Z and R can be calculated according the following formulas:

$$R = O_{mol}/(Si_{mol}+Al_{mol}+B_{mol}). \quad (1)$$

$$Y = 2Z - 2R. \quad (2)$$

$$X = 2R - Z. \quad (3)$$

For silicates:

$$Z = 4. \quad (4)$$

From the formulas (1), (3) and (4), it can be concluded that:

$$X = 2 \times O_{mol}/(Si_{mol}+Al_{mol}+B_{mol}) - 4 \quad (5)$$

Only considering the effect of NBO, however, could lead to lower hardness and higher fracture toughness of the glass at higher NBO values. It is therefore an insight of the present disclosure to simultaneously adjust the ratio $B_2O_3/Al_2O_3$ to higher values, which can render the glass more scratch resistant due to the effect of boron on the modification of the glass network. It has been found that a good dicing performance of the glass can be achieved by adjusting both NBO and $B_2O_3/Al_2O_3$ simultaneously, in accordance with the limits given by exemplary embodiments of the present disclosure.

In an exemplary embodiment, the average number of non-bridging oxygen per polyhedron is equal to or larger than −0.18, such as equal to or larger than −0.16, and/or wherein the ratio $B_2O_3/Al_2O_3$ is equal to or larger than 0.8, such as equal to or larger than 1.0.

In some exemplary embodiments, the glass is an alkali-free glass and has a composition in mol-% of:

| | |
|---|---|
| $SiO_2$ | 60-70, |
| $Al_2O_3$ | 7-17, |
| $B_2O_3$ | 8-15, |
| MgO | 0-10, |
| CaO | 0-10, |
| SrO | 0-10, and |
| BaO | 0-10. |

"Alkali-free" hereby refers to an alkali content of less than 0.01 mol-%.

In another exemplary embodiment, the glass can be an alkali containing glass and has a composition in mol-% of:

| | |
|---|---|
| $SiO_2$ | 75-85, |
| $Al_2O_3$ | 1-5, |
| $B_2O_3$ | 10-20, |
| $Na_2O$ | >0-5, |
| $K_2O$ | >0-5, |
| MgO | 0-10, |
| CaO | 0-10, |
| SrO | 0-10, and |
| BaO | 0-10. |

In an exemplary embodiment, the low CTE boro-aluminosilicate glass has a brittleness index $H_V/K_{IC}$ which is equal to or smaller than 12 $\mu m^{-1/2}$, such as equal to or less than 10 $\mu m^{-1/2}$, or equal to or less than 8 $\mu m^{-1/2}$, wherein $H_V$ refers to the Vicker's hardness and $K_{IC}$ refers to the fracture toughness of the glass. The fracture toughness KIC thereby denotes the critical stress intensity factor at which a thin crack in the glass begins to grow.

The Vicker's hardness, HV, in MPa is measured by applying a force of 0.2 kgf with a pyramidal indenter to the surface of the glass wafer and calculating $H_V$ according to $H_V = 1.8 \cdot P/a^2$, where P is the test load on the indenter in MPa and a denotes the half length of the indentation diagonal in $\mu m$. The fracture toughness, in units of $MPa \cdot m^{1/2}$, is then calculated by the following formula: $K_{IC} = 0.16 \cdot (c/a)^{-3/2} (HV \cdot a^{1/2})$, where a is the half length of the indentation diagonal in $\mu m$ and c is the half length of the crack generated by indentation in $\mu m$. Correspondingly, the brittleness can be obtained from the hardness divided by the fracture toughness.

For use of the low CTE glass according to the present disclosure in semiconductor applications, the low CTE glass may be essentially free of $Li_2O$ in order to prevent contamination of a silicon substrate by lithium ions. "Essentially free" hereby refers to a content of less than 0.01 mol-%.

In some exemplary embodiments, the low CTE boro-aluminosilicate glass has a coefficient of thermal expansion (CTE) equal to or larger than 2.0 ppm/K, such as equal to or less than 4.0 ppm/K. In some embodiments, the CTE of the glass is in the range from 2.6 ppm/K to 3.8 ppm/K. The CTE of the glass may be close to the CTE of a silicon substrate in order to avoid warps or cracks that can occur due to a mismatch of CTE between a glass carrier wafer made from the low CTE boro-aluminosilicate glass and a silicon substrate bonded thereto.

In an exemplary embodiment, the low CTE boro-aluminosilicate glass has a transition temperature $T_g$ higher than 550° C., such as higher than 650° C. or higher than 700° C.

In some exemplary embodiments disclosed herein, the low CTE boro-aluminosilicate glass is provided as a glass wafer. The glass wafer may have a thickness in the range from 0.05 mm to 1.2 mm, such as in the range from 0.1 mm to 0.7 mm. The glass wafer may have a thickness equal to or smaller than 1.2 mm, equal to or smaller than 0.7 mm, equal to or smaller than 0.5 mm, equal to or smaller than 0.35 mm, equal to or smaller than 0.1 mm, or equal to or smaller than 0.05 mm. Exemplary thicknesses are 100 µm, 200 µm, 250 µm, 400 µm, 500 µm, 550 µm, 700 µm, and 1000 µm. Surface dimensions of the glass wafer may be approximately 15 cm, 20 cm, or 30 cm, or, according to the specific requirements, approximately 6", 8" or 12". The shape of the glass wafer can be rectangular or circular as well as elliptical. Other shapes and dimensions can also be applied if the specific application so requires.

In an exemplary embodiment, the glass carrier wafer has a maximum edge chipping size after dicing which is equal to or less than 30 µm, such as equal to or less than 20 µm, or equal to or less than 10 µm. For many applications, a maximum edge chipping size of 30 µm may be sufficient. It is, however, useful to further increase the usable effective area which is not affected by the chipping after dicing and thus to further decrease the maximum edge chipping size.

The dicing may be achieved by cutting with a resin blade, a diamond particle blade, or a composite blade. The blade may have, e.g., a diameter of 56 mm, a thickness of 0.15 mm, a feeding rate of 5 mm/s, and a rotation speed of 20,000 rpm. It is to be understood, however, that the glass also has useful properties if other blade and/or process parameters are adopted. The previously described values for the maximum edge chipping size are understood as the values that can be obtained by optimized dicing parameters, which can be determined by the skilled artisan.

The present disclosure further concerns a bonded article including such a glass carrier wafer and a silicon substrate bonded thereto, such as by an adhesive. If the application requires de-bonding, the adhesive can be, e.g., UV sensitive, and can be deactivated by irradiation with UV-radiation. This can be useful if the glass carrier wafer is used for processing methods of a silicon substrate as, e.g., during thinning and/or back grinding of the silicon substrate. It has been shown that adjusting the NBO of a given glass composition can also be useful for the transmittance and solarization resistance of such glass carrier wafers (see, e.g., PCT Application No. PCT/CN2015/071159).

The low CTE boro-aluminosilicate glass and the glass carrier wafer made thereof according to exemplary embodiments disclosed herein, however, may be used as a glass carrier wafer for the processing of a silicon substrate, such as in a wafer-level-packaging (WLP) application, and, or in particular, of micro-electro-mechanical systems (MEMS). WLP refers to a technology of packaging, e.g., an integrated circuit, while still being part of the wafer, in contrast to the known method of cutting the wafer into individual circuits (dice) and then packaging them. MEMS are small integrated devices or systems that comprise electrical and mechanical components. The components can range in size from the sub-micrometer level to the millimeter level, and there can be any number from one, to few, to potentially thousands or millions in a particular system. WLP processes are particular useful in the production of MEMS.

In an exemplary use of the glass carrier wafer, the processing of the silicon substrate bonded thereto comprises dicing the silicon substrate from the glass carrier wafer side while being adhered to the glass wafer. In this case, a first cut can be made from the glass wafer side through the glass wafer into, e.g., the adhesive layer, without cutting the silicon substrate. A second cut, which may be made with a thinner cutting blade, can then be made in the groove of the first cut, separating the silicon substrate into dies while still adhering to the also-cut glass carrier wafer. In some embodiments, a dicing film, such as a dicing tape, is applied to the silicon substrate prior to dicing, e.g., prior to making the second cut. The dicing film is generally left intact during the second cut.

It is to be noted that compound cutting blades are available by which the previously described dicing can also be achieved in one single cutting step. Since there are certain issues regarding, e.g., dicing yield and blade lifetime control, the previously described dicing method with two cutting steps is still preferred in the art. Due to the separate cutting blades used for the different materials, process parameters and blade conditions can be better controlled and adapted to the respective materials to be cut.

The disclosed low CTE boro-aluminosilicate glass shows that, in some exemplary embodiments of the present disclosure, a method for providing a low CTE boro-aluminosilicate glass including at least $SiO_2$, $Al_2O_3$, and $B_2O_3$ with a low brittleness is provided. In some embodiments, the method includes altering a given low CTE boro-aluminosilicate glass composition by adjusting the NBO number of the composition and adjusting the ratio of $B_2O_3/Al_2O_3$, wherein the NBO number is defined as $NBO=2 \times O_{mol}/(Si_{mol}+Al_{mol}+B_{mol})-4$, in order to achieve a low brittleness index $H_V/K_{IC}$, such as a brittleness index $H_V/K_{IC}$ which is lower than 12 $\mu m^{-1/2}$. In some embodiments, the method includes adjusting the NBO number to lie above a lower limit, where the lower limit may be −0.2. In some embodiments, the method includes adjusting the $B_2O_3/Al_2O_3$ ratio to lie above a lower limit, such as above a lower limit of 0.5.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION OF THE INVENTION

Figure 1:
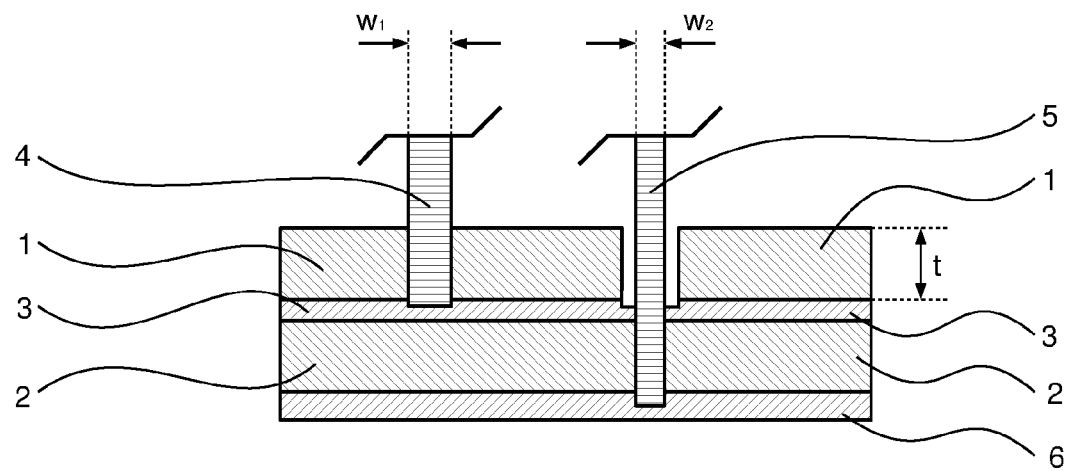
FIG. 1 is a schematic cut view of an exemplary dicing process in a wafer level packaging (WLP) application.

FIG. 1 shows an exemplary dicing process in a wafer level packaging (WLP) application. A silicon substrate 2 is adhered via an adhesive layer 3 to a glass wafer 1. The glass wafer 1 has a thickness t. In a first cutting step, the glass wafer 1 is cut with a first blade 4 having a first width $w_1$. The cut thereby extends into the adhesive layer 3, but not into the silicon substrate 2. The cut is achieved via a rotating blade 4.

Once the cut with the first blade 4 is established, a second cut with a second blade 5 is performed. The second blade 5 has a second width $w_2$, which is smaller than the width $w_1$ of the first blade 4. The second cut is made within the cutting groove from the first cutting step. Due to the smaller width $w_2$ of the second cutting blade 5, the second cutting step can be performed without affecting the glass wafer 1. The second cut extends through the silicon substrate 2 and may extend into a dicing tape 6 preventing the now completely separated dies from falling apart. The dicing tape 6 is applied before the second cutting step, before or after the first cutting step.

Figure 2:
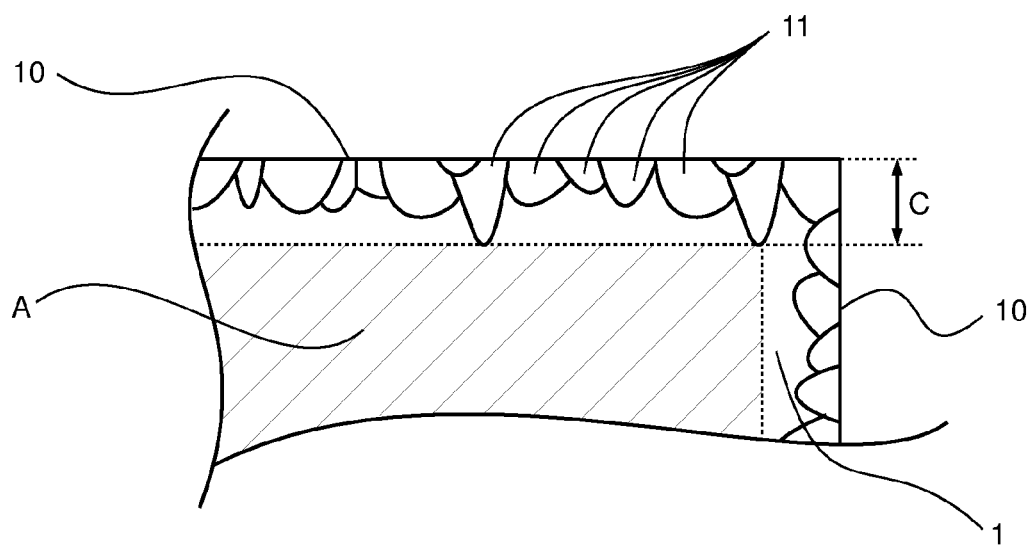
FIG. 2 is a schematic view of cutting edges of a glass wafer with edge chipping after cutting.

After cutting, the glass wafer 1 has fresh cutting edges 10, as schematically shown in FIG. 2. The cutting edges 10 usually show a certain degree of edge chipping 11 as a result from the first cutting process. Such edge chipping 11 can, e.g., give rise to propagating cracks that ultimately result in breakage of the glass wafer 1 during cutting or further processing. Furthermore, the edge chipping 11 reduces the effective usable area A after dicing. Reducing edge chipping 11 can therefore increase the dicing yield. Generally, a characteristic maximum edge chipping size C can be identified, which depends on e.g., the used cutting blades and other cutting parameters such as feeding speed and rotation rate of the blade. For a given set of cutting parameters, however, the maximum edge chipping size C can be reduced by the specific glass material used for the glass wafer 1.

A glass wafer 1 made from exemplary embodiments of the glass thereby provides a low tendency to edge chipping and, as such, allows for high dicing yield as can be seen from the following examples.

EXAMPLES

The following Table 1 shows compositions of 11 exemplary glasses formed according to the present disclosure. Examples 12 to 14 show exemplary comparative glasses that do not fall within the scope of the disclosure. Examples 1 to 5 and 7 to 11 show alkali free glass compositions whereas example 6 describes an alkali containing glass.

TABLE 1

Compositions of examples 1 to 11 formed in accordance with the present disclosure and comparative examples 12 to 14.

| Mol-% | $SiO_2$ | $Al_2O_3$ | $B_2O_3$ | $Na_2O$ | $K_2O$ | MgO | CaO | BaO |
|---|---|---|---|---|---|---|---|---|
| Glass 1 | 60 | 16 | 9.5 | | | 6.6 | 6.5 | 1.4 |
| Glass 2 | 62.5 | 14 | 10 | | | 7.6 | 5.5 | 0.4 |
| Glass 3 | 67 | 12 | 9.6 | | | 4.58 | 4.5 | 2.4 |
| Glass 4 | 67.166 | 11.32 | 9.9 | | | 4.58 | 5.5 | 1.4 |
| Glass 5 | 66 | 11 | 10.6 | | | 6.58 | 5 | 0.9 |
| Glass 6 | 82.50 | 1.52 | 11.67 | 3.91 | 0.39 | | | |
| Glass 7 | 67.125 | 9.625 | 11.225 | | | 5.125 | 5.5 | 1.4 |
| Glass 8 | 64.5 | 10 | 12 | | | 6.6 | 5.5 | 1.4 |
| Glass 9 | 65.5 | 9 | 12 | | | 7.6 | 4.5 | 1.4 |
| Glass 10 | 65.375 | 8.375 | 12.375 | | | 6.975 | 5.5 | 1.4 |
| Glass 11 | 64.5 | 8 | 13 | | | 7.5 | 6 | 1 |
| Glass 12 | 62.6 | 16.5 | 8 | | | 7.5 | 4 | 1.4 |
| Glass 13 | 60 | 19 | 8.6 | | | 6 | 5 | 1.4 |
| Glass 14 | 60 | 21 | 8.6 | | | 5 | 4 | 1.4 |

The following Table 2 lists selected relevant parameters of the glass compositions of examples 1 to 11 and comparative examples 12 to 14 according to Table 1.

TABLE 2

Structure parameters, properties and performance of glass examples 1 to 11 and comparative examples 12 to 14.

| | Structure parameters | | | | Property | | | | Performance |
|---|---|---|---|---|---|---|---|---|---|
| | Z | R | NBO | $B_2O_3/Al_2O_3$ | $T_g$ (°C.) | CTE ($10^{-6}$/K) | $H_V 0.2$ (MPa) | $K_{IC}$ (MPa·m$^{1/2}$) | Brittleness (μm$^{-1/2}$) | Chipping size (μm) |
| Glass 1 | 4 | 1.901 | −0.198 | 0.594 | 707 | 3.23 | 5322 | 0.45 | 11.90 | 30 |
| Glass 2 | 4 | 1.905 | −0.190 | 0.714 | 705 | 3.21 | 5256 | 0.47 | 11.20 | 28 |
| Glass 3 | 4 | 1.91 | −0.184 | 0.800 | 712 | 3.14 | 5361 | 0.51 | 10.52 | 26 |
| Glass 4 | 4 | 1.911 | −0.178 | 0.875 | 710 | 3.15 | 5471 | 0.54 | 10.07 | 23 |
| Glass 5 | 4 | 1.92 | −0.167 | 0.964 | 715 | 3.10 | 5524 | 0.64 | 8.58 | 18 |
| Glass 6 | 4 | 1.918 | −0.163 | 7.651 | 557 | 3.27 | 5463 | 0.73 | 7.46 | 10 |
| Glass 7 | 4 | 1.919 | −0.162 | 1.166 | 711 | 3.12 | 5626 | 0.77 | 7.35 | 14 |
| Glass 8 | 4 | 1.92 | −0.157 | 1.200 | 703 | 3.25 | 5325 | 0.74 | 7.20 | 13 |
| Glass 9 | 4 | 1.93 | −0.140 | 1.333 | 706 | 3.22 | 5519 | 0.80 | 6.90 | 12 |
| Glass 10 | 4 | 1.94 | −0.129 | 1.478 | 709 | 3.19 | 5723 | 0.88 | 6.50 | 9 |
| Glass 11 | 4 | 1.94 | −0.122 | 1.625 | 708 | 3.23 | 5653 | 0.87 | 6.50 | 11 |
| Glass 12 | 4 | 1.896 | −0.208 | 0.485 | 702 | 3.18 | 5360 | 0.43 | 12.5 | 32 |
| Glass 13 | 4 | 1.868 | −0.264 | 0.453 | 695 | 3.11 | 5385 | 0.41 | 13.2 | 33 |
| Glass 14 | 4 | 1.839 | −0.322 | 0.410 | 691 | 3.05 | 5410 | 0.39 | 13.8 | 35 |

The examples 1 to 11 formed in accordance with the present disclosure cover a range of NBO numbers from (rounded) −0.2 to −0.12. The ratio of $B_2O_3/Al_2O_3$ thereby lies in the range from (rounded) 0.6 to approximately 1.6. The glass transition temperatures range from (rounded) 560° C. to 715° C. As can be seen from Table 2, the Vicker's hardness $H_V$ of all glass samples 1 to 11 lies in the range from (rounded) 5255 MPa to 5725 MPa and the fracture toughness $K_{IC}$ ranges from 0.45 MPa·m$^{1/2}$ to 0.88 MPa·m$^{1/2}$. The resulting brittleness, defined as $H_V/K_{IC}$ ranges from 6.5 µm$^{-1/2}$ to 11.9 µm$^{-1/2}$.

The comparative examples 12 to 14 have NBO numbers below −0.2 and a ratio $B_2O_3/Al_2O_3$ of less than 0.5.

Table 2 also shows (in the right-most column) the resulting chipping performance during cutting of the glass samples. "Chipping size" hereby refers to the maximum chipping size C, as schematically shown in FIG. 2. The samples were cut with a soft 600 mesh dicing blade having a diameter of 56 mm and width $w_1$ of 0.15 mm, with a feeding rate of 5 mm/s at a rotation speed of 20,000 rpm. It has been found that the chipping performance is not very sensitive to the dicing parameters and corresponding results were found for a range of dicing parameters as they are usually applied in the art in, e.g., WLP applications.

The thickness t of the glass samples was 0.5 mm for all glass compositions of examples 1 to 14. It can be seen that, for all NBO numbers equal or above a value of −0.2, the resulting maximum edge chipping size is equal to or smaller than 30 µm, whereas the maximum edge chipping size for the comparative examples 12 to 14 is above 30 µm.

Figure 3:
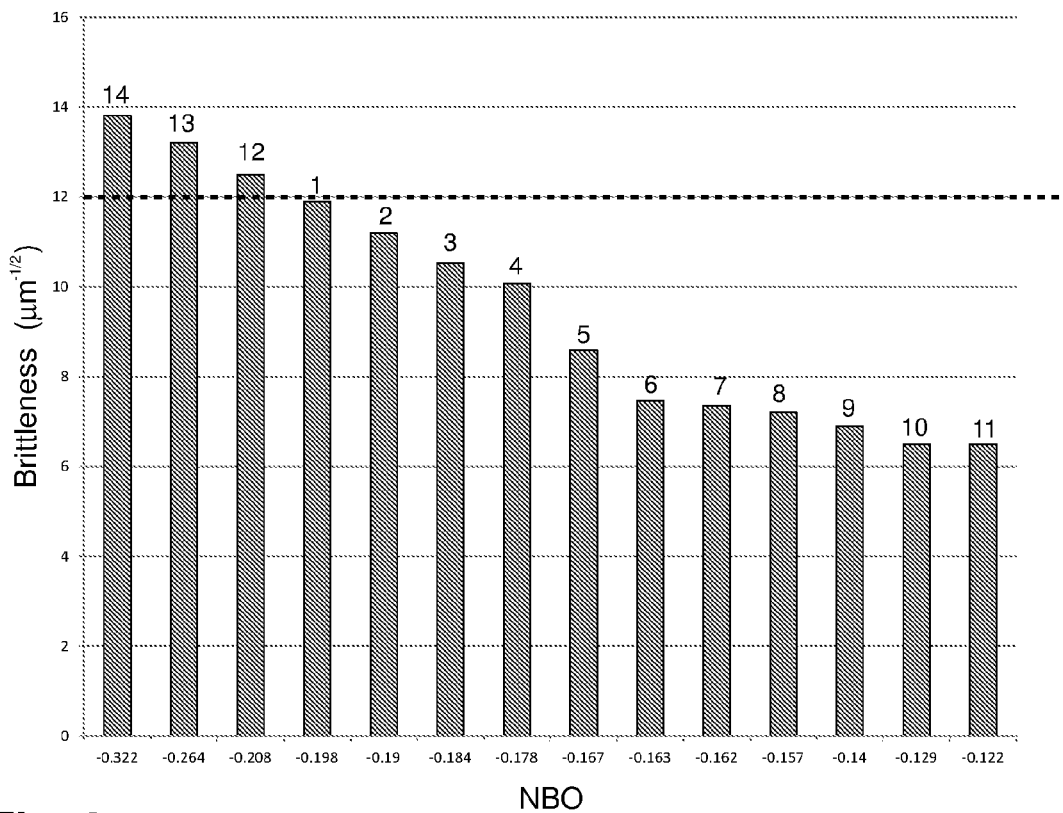
FIG. 3 is a diagram of NBO vs. brittleness for several exemplary glass compositions.
Figure 4:
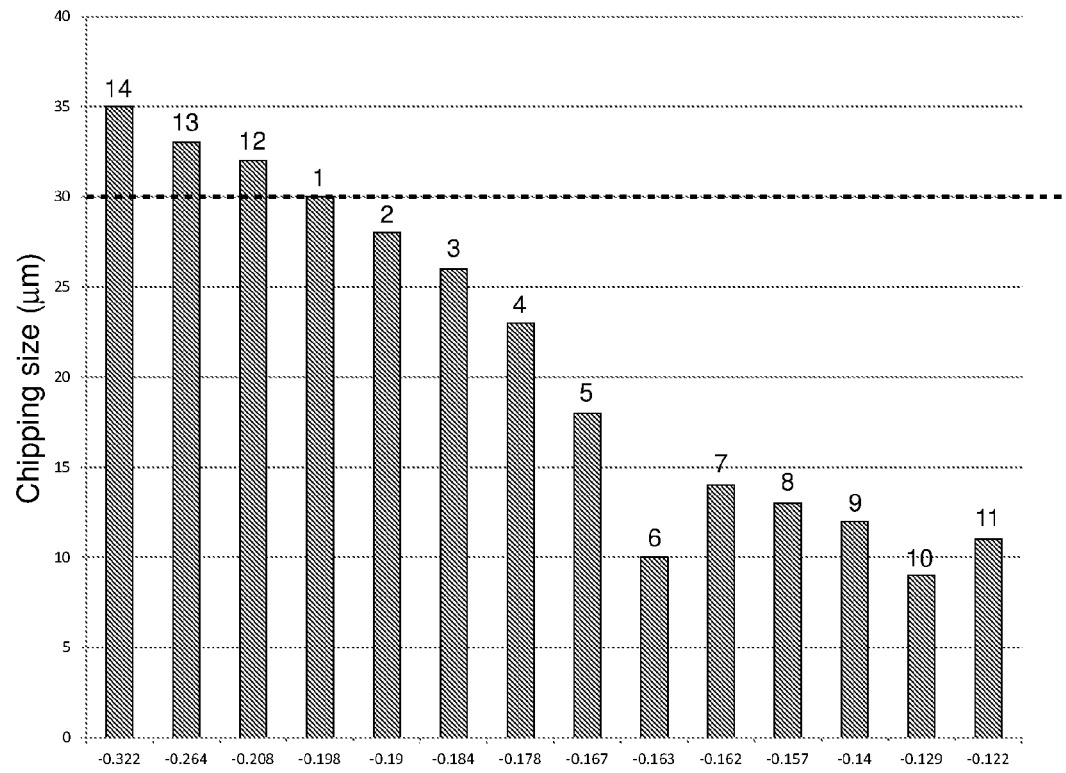
FIG. 4 is a diagram of NBO vs. maximum edge chipping size for several exemplary glass compositions.
Figure 5:
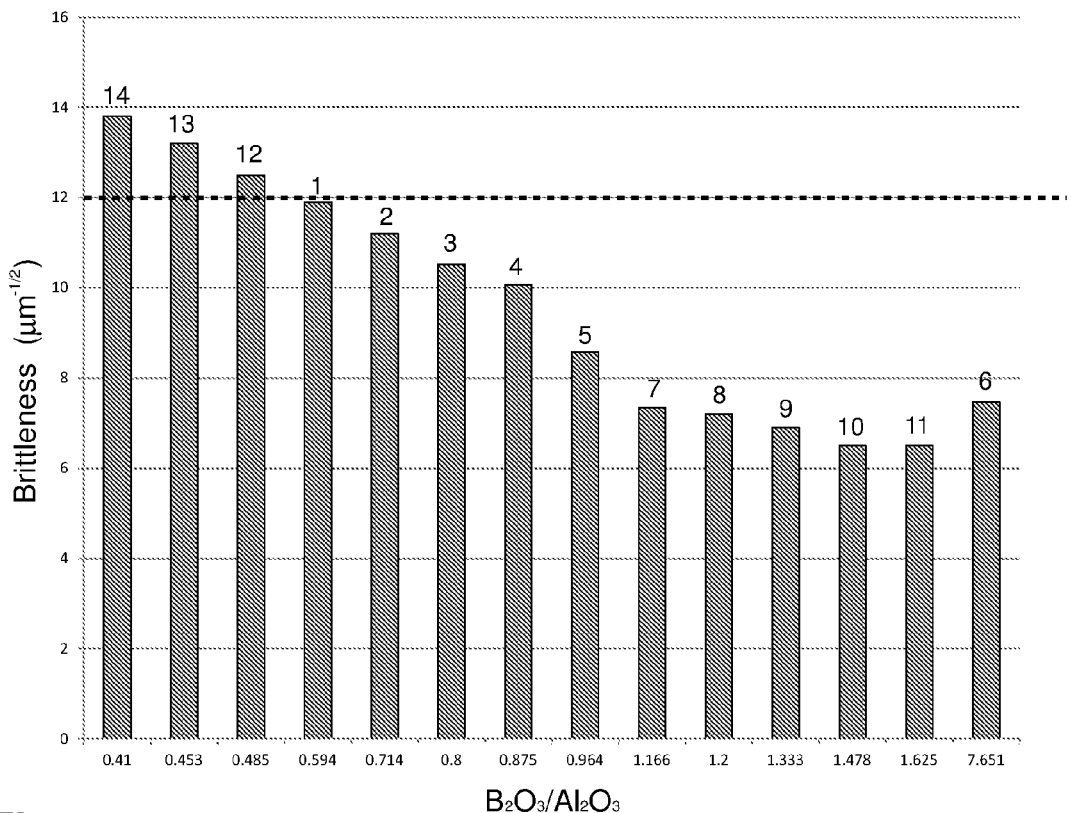
FIG. 5 is a diagram of the ratio $B_2O_3/Al_2O_3$ vs. brittleness for several exemplary glass compositions.
Figure 6:
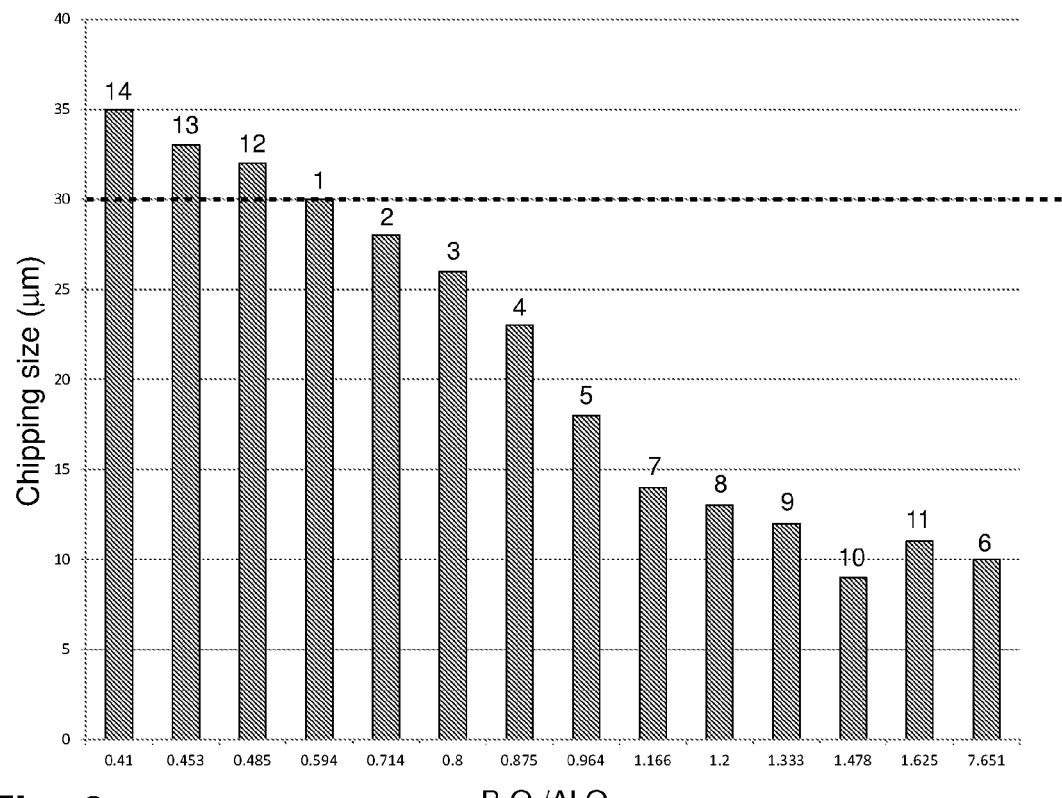
FIG. 6 is a diagram of the ratio $B_2O_3/Al_2O_3$ vs. maximum edge chipping size for several exemplary glass compositions.

FIG. 3 shows the values of the brittleness $H_V/K_{IC}$ in dependence on the NBO number, whereas FIG. 4 shows the corresponding values for the chipping size. FIGS. 5 and 6 show the corresponding diagrams in dependence on the ratio of $B_2O_3/Al_2O_3$. All plots show a clear trend to decreasing brittleness and chipping size in dependence on the relevant parameters NBO and $B_2O_3/Al_2O_3$, where a transition of the brittleness index $H_V/K_{IC}$ from above 12 µm$^{-1/2}$ (dashed line) to below and a transition of the maximum chipping size from above 30 µm (dashed line) to below occurs at an NBO value of −0.2 and a ratio $B_2O_3/Al_2O_3$ of 0.5.

Figure 7:
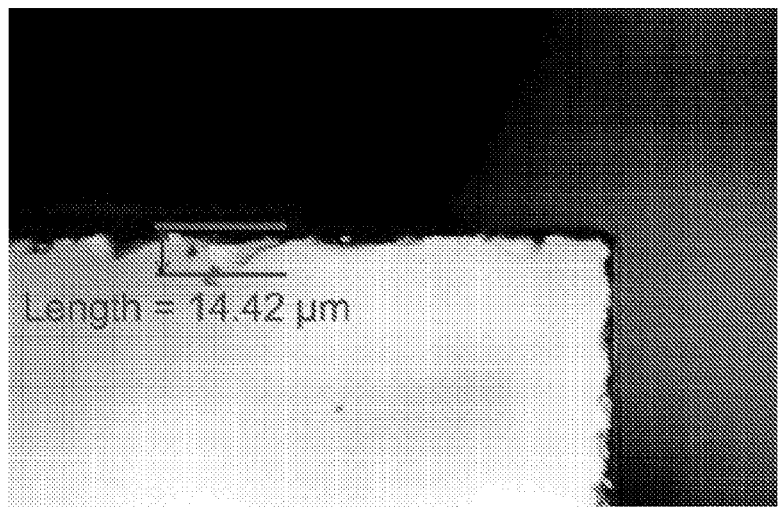
FIG. 7 is an enlarged view of cutting edges of a glass sample formed in accordance with the present disclosure having an NBO of −0.162.
Figure 8:
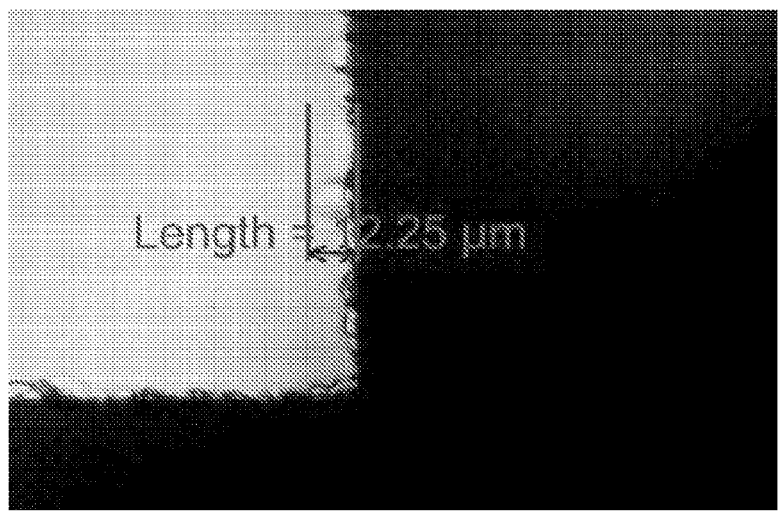
FIG. 8 is an enlarged view of cutting edges of a glass sample formed in accordance with the present disclosure having an NBO of −0.140.
Figure 9:
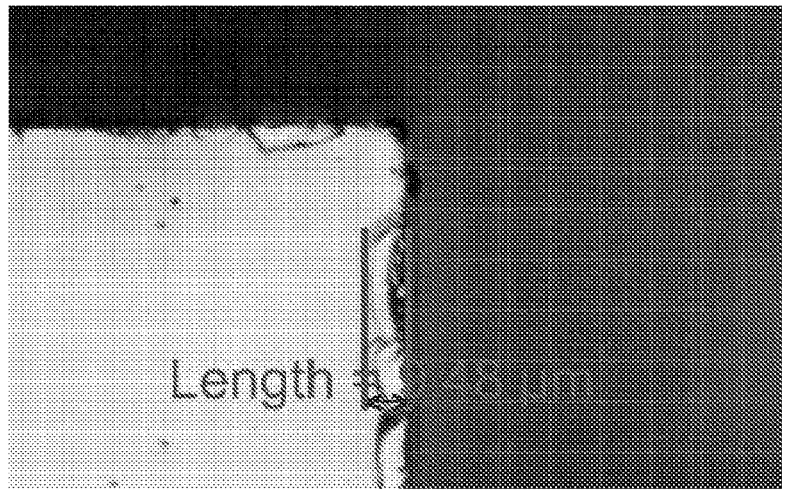
FIG. 9 is an enlarged view of cutting edges of a glass sample formed in accordance with the present disclosure having an NBO of −0.129.

FIGS. 7 to 9 show enlarged views of cutting edges of selected samples of examples 7, 9 and 10 according to Table 1. FIG. 7 shows a sample of a glass according to example 7 having an NBO of −0.162. As can be seen from FIG. 7, the maximum edge chipping size is 14.42 µm, which has been rounded to 14 µm in Table 1. Similarly, FIG. 8 shows a sample of a glass according to example 9 of Table 1 having an NBO of −0.140 and a resulting maximum edge chipping size of 12.25 µm. FIG. 9 shows a sample of a glass according to example 10 having an NBO of −0.129 with a maximum edge chipping size of 9.48 µm. The corresponding values for the maximum edge chipping sizes in Table 1 were rounded to the next whole number in each case.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An article of manufacture, comprising:
a glass carrier wafer for use in wafer-level-packing (WLP) applications formed of a boro-aluminosilicate glass comprising a composition in mol-% of:

| | |
|---|---|
| $SiO_2$ | 60-85; |
| $Al_2O_3$ | 1-10; |
| $B_2O_3$ | 11-20; |
| $Na_2O$ | 0-5; |
| $K_2O$ | 0-5; |
| MgO | 0-10; |
| CaO | 0-10; |
| SrO | 0-10; and |
| BaO | 0-10, | wherein an average number of non-bridging oxygen per polyhedron (NBO) is equal to or larger than −0.18 and a ratio $B_2O_3/Al_2O_3$ is equal to or larger than 1.1, wherein the NBO is defined as NBO=$2\times O_{mol}/(Si_{mol}+Al_{mol}+B_{mol})-4$, wherein a coefficient of thermal expansion of the glass is in a range from 2.6 ppm/K to 3.8 ppm/K.

2. The article according to claim 1, wherein the glass is an alkali-free glass and comprises a composition in mol-% of:

| | |
|---|---|
| $SiO_2$ | 60-70; |
| $Al_2O_3$ | 7-10; |
| $B_2O_3$ | 11-15; |
| MgO | 0-10; |
| CaO | 0-10; |
| SrO | 0-10; and |
| BaO | 0-10. |

3. The article according to claim 1, wherein the glass is an alkali containing glass and comprises a composition in mol-% of:

| | |
|---|---|
| $SiO_2$ | 75-85; |
| $Al_2O_3$ | 1-5; |
| $B_2O_3$ | 11-20; |
| $Na_2O$ | >0-5; |
| $K_2O$ | >0-5; |
| MgO | 0-10; |
| CaO | 0-10; |
| SrO | 0-10; and |
| BaO | 0-10. |

4. The article according to claim 1, wherein the composition of the boro-aluminosilicate glass is essentially free of $Li_2O$.

5. The article according to claim 1, wherein:
the NBO of the glass is equal to or larger than −0.17.

6. The article according to claim 5, wherein
the NBO of the glass is equal to or larger than −0.16.

7. The article according to claim 1, wherein the NBO of the glass is equal to or less than −0.1 and the ratio $B_2O_3/Al_2O_3$ is equal to or less than 10.

8. The article according to claim 1, wherein the boro-aluminosilicate glass has a transition temperature $T_g$ higher than 550° C.

9. The article according to claim 1, wherein a transition temperature $T_g$ of the glass is higher than 650° C.

10. The article according to claim 1, wherein a brittleness index $H_V/K_{IC}$ of the glass is equal to or less than 10 µm$^{-1/2}$, wherein $H_V$ refers to a Vicker's hardness of the boro-aluminosilicate glass and $K_{IC}$ refers to a fracture toughness of the boro-aluminosilicate glass.

11. The article according to claim 10, wherein the brittleness index $H_V/K_{IC}$ of the glass is equal to or less than 8 $\mu m^{-1/2}$.

12. The article according to claim 1, wherein the glass carrier wafer has a thickness of 1.2 mm or less.

13. The article according to claim 1, wherein a maximum edge chipping size after dicing of the glass carrier wafer is equal to or less than 20 μm.

14. The article according to claim 1, further comprising a silicon substrate bonded to the glass carrier wafer.

15. The article according to claim 14, further comprising an adhesive layer bonding the silicon substrate to the glass carrier wafer.

16. The article according to claim 1, further comprising a dicing film applied to the silicon substrate.

17. The article according to claim 16, wherein the dicing film is a dicing tape.

\* \* \* \* \*